United States Patent [19]

Schriner

[11] Patent Number: 4,938,447

[45] Date of Patent: Jul. 3, 1990

[54] STAND FOR A PAPER-DISCHARGING DEVICE

[76] Inventor: Michael J. Schriner, 19 Brandon Pl., Rocky River, Ohio 44116

[21] Appl. No.: 308,721

[22] Filed: Feb. 9, 1989

[51] Int. Cl.[5] .......... F16M 13/00

[52] U.S. Cl. .......... 248/670; 211/13; 248/676; 248/918; 248/924

[58] Field of Search .......... 248/917, 918, 201, 676, 248/670, 678, 675, 924, 639, 637; 211/13, 26; 400/682, 717, 718, 691

[56] References Cited

U.S. PATENT DOCUMENTS

| | | | |
|---|---|---|---|
| D. 286,715 | 11/1986 | Schriner . | |
| 2,554,559 | 5/1951 | Chadwell . | |
| 2,698,152 | 12/1954 | Kaye . | |
| 3,090,586 | 5/1963 | Schwegler et al. . | |
| 3,559,592 | 2/1971 | Closa . | |
| 3,885,762 | 5/1975 | Sebastiani . | |
| 4,382,733 | 5/1983 | Rodgers . | |
| 4,544,065 | 10/1985 | Mueller . | |
| 4,651,967 | 3/1987 | McCoy | 248/676 |
| 4,691,891 | 9/1987 | Dionne | 248/205.3 |
| 4,703,919 | 11/1987 | Drake et al. . | |
| 4,707,156 | 11/1987 | Clark . | |
| 4,725,033 | 2/1988 | Zinnecker . | |
| 4,749,295 | 6/1988 | Bankier et al. . | |
| 4,773,781 | 9/1988 | Bankier . | |

FOREIGN PATENT DOCUMENTS

| | | | |
|---|---|---|---|
| 1493962 | 7/1967 | France . | |
| 2538663 | 6/1984 | France | 248/675 |

OTHER PUBLICATIONS

Feed'n Fold Printer Stand, Herrington Catalogue, 1989, Londonderry, N.H. p. 23.

Universal Printer Stand, Devoke, Santa Clara, CA., Catalog 87F11, p. 33, 1987.

*Primary Examiner*—David L. Talbott
*Attorney, Agent, or Firm*—Watts, Hoffmann, Fisher & Heinke

[57] ABSTRACT

An integrated, demountable stand for a printer, plotter or other graphic output device that discharges an output of paper, the stand comprising: a pair of load-bearing platforms, one on each side of a paper supply access to the device, a catcher for the paper output from the device, adjustable means for stabilizing the space between the platforms at a magnitude effective for maintaining the device steady; and adjustable means for stabilizing the distance between the catcher and the platforms at a magnitude effective for maintaining an orderly paper flow.

9 Claims, 4 Drawing Sheets

STAND FOR A PAPER-DISCHARGING DEVICE

BACKGROUND OF THE INVENTION

This invention relates to a stand for a paper-discharging or dispensing burden in the nature of a printer, a plotter, or other graphic output device, and more particularly to one that is adjustable to fit various sizes of burden and permit a feed of paper thereto from underneath or the rear. Most commonly the burden is a printer for a computer product, and it may be referred to in this application for brevity as a printer from time to time with the intention of including the other related burdens also. Usually, the printer is supplied with fan-fold paper adapted for tractor feed.

Exemplary of the prior art in this field is: my Design U.S. Pat. No. 286,715 and U.S. Pat. No. 4,703,919, both for small independent stand units used usually in pairs; U.S. Pat. No. 4,544,065 which is a very steeply-pitched printer-holding deck with a paper supply cavity below a horizontal cantilevered platform at the rear, the platform being for receiving the paper output; U.S. Pat. No. 4,707,156 which is a slightly less steeply-pitched printer-holding deck with a paper output refolding element stacked generally above and rearward of a paper supply element; and U.S. Pat. Nos. 4,749,295 and 4,773,781 for paper catchers or collectors that mount above a printer.

Advantages of the instant stand over the independent stand units include a capacity to accept and collect paper output while maintaining a desired interval between the stand pair. Advantages of the instant stand over conventional desk-top printer stands which are designed to collect paper output are: broad adjustability for a variety of sizes of the burden such as a printer; lighter weight; availability of a most generally lower practical slope for holding the printer coupled with a large capacity for the output at a low profile of printer and stand; compact storage when disassembled; and two-dimensional adjustability for maintaining an unobstructed input of paper feed into the printer and an orderly collection of paper output from the printer in the catcher (such input and output sometimes referred to herein as the "orderly paper flow"). In the case of fan-fold paper this includes refolding.

Broad Statement of the Invention

The instant invention is an integrated, demountable stand assembly for a paper-discharging burden in the nature of a printer, plotter, or other graphic output device. It is made for emplacement on a desk or table top. It comprises a pair of load-bearing platforms, each with a base, one platform for each side of a paper access route to the burden for supporting the burden; a catcher for the paper output from the burden disposed to the rear of the burden and reaching substantially as deeply as the bases of the platforms; adjustable means for stabilizing the space between the platforms at a magnitude effective for maintaining the burden steady and the input path of paper into the burden unobstructed by a platform; and adjustable means for stabilizing the distance between the catcher and the platforms at a magnitude effective for maintaining an orderly paper flow.

BEST MODE FOR CARRYING OUT THE INVENTION

Preferably the entire stand structure, except for cushions and non-skid surfaces, is of molded polymer, e.g., a hard thermoplastic resin, and "thick" parts such as posts, toes, rests and platform base rails are molded to be hollow in their interiors, usually three-sided, but reasonably rigid. The stand is suitable for putting on a desk or table and can be supplied with paper through a hole in the desk or from a stack of paper between its platforms.

Figure 1:
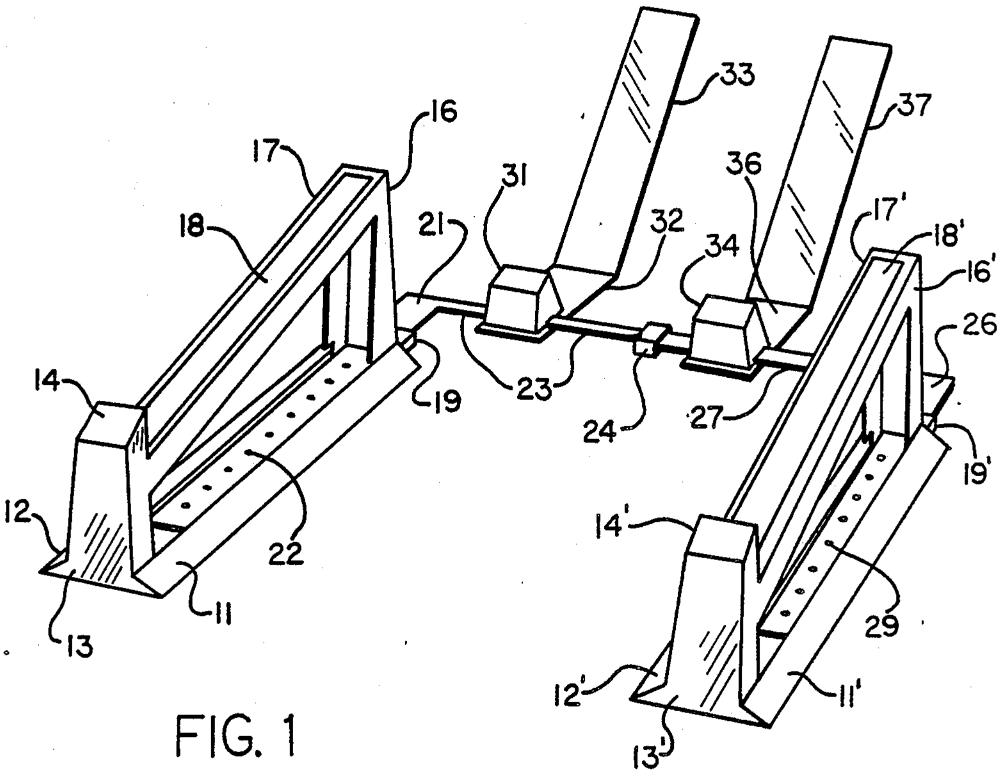
FIG. 1 is an isometric view of the instant stand assembled.

Referring to FIG. 1, the left platform has right side base rail 11, left side base rail 12, front post 13 terminating in stop 14, inclined rest 17, rear post 16, adherent rubbery friction strip 18, and a short rear sleeve 19. The right platform is identical, the parts being numbered like those of the left platform but with prime marks added. Usually the platforms are set parallel and opposite each other.

The adjustable width spreader between these platforms is the base of a U-shaped composite element formed of 2 ell-shaped pieces having strip portions that overlap. Left side strip 23 extends through toe 31 of the left part of the paper catcher, on through sliding ring 24, and under the right side strip 27 inside of the toe 34 of the right part of the paper catcher. Adjusting the overlap of strips 23 and 27 fixes the space between the platforms.

The rest of the U-shaped composite elements are forward-directed arms 21 and 26. These arms are integral with the strips from which they project. Arm 21 extends slidably through the short rear sleeve 19 projecting from the rear of the left platform base and on between the base rails of the left platform where it is perforated with a line of holes designated 22. Arm 26 extends likewise through rear sleeve 19' and on between the base rails of the right platform where it is perforated with a line of holes designated 29. A peg or pin (not shown) reaching down from the inside top of the sleeve is made to engage a selected hole in an arm. This adjustably fixes the distance between the base of the U (from which the paper catcher elements project rearwardly) and the rear of a platform. Normally, this distance is made the same for each platform.

The paper catcher is made in two cradling parts slidably engaged to the base of the U as follows: the left part has toe 31 with a narrow slot in its bottom, base 32, back 33, and a back brace, not shown; the left part has toe 34 with a slightly taller and wider slot in its bottom (to accommodate strip 27's overlapping the lower strip 23 inside the toe 34), base 36, back 37, and a back brace not shown. The two cradling parts are in basically a "chac-mool" posture to receive and hold one sheet or refold and hold a pile of output fan-fold paper as the paper issues from the printer.

Figure 2:
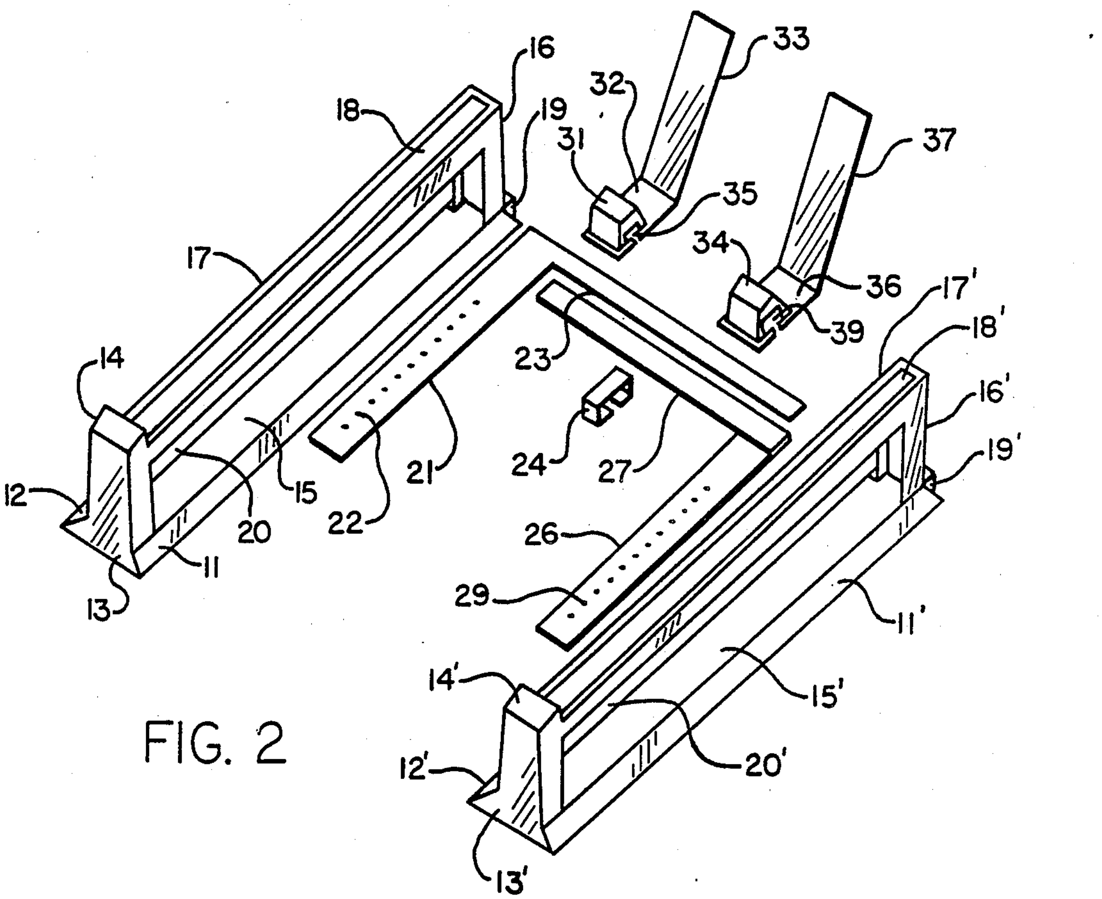
FIG. 2 is an "exploded" view of various parts of the stand.

FIG. 2 depicts the interconnecting pieces of FIG. 1 in "exploded" fashion with a bit more detailing that will be evident. All the numbered elements of FIG. 2 that have the same number as those of FIG. 1 are the same. Additionally, these further elements are shown in FIG. 2; the slots 15 and 15' between base rails of each platform; the inner sides 20 and 20' of the left side base rails of each platform; slot 35 in toe 31; higher and wider slot 39 in toe 34; and the ridge formed between raised strip 27 and arm 26 of the right hand ell-shaped piece so that strip 27 will ride over strip 23 to overlap it when the two strips are engaged in the form of the bottom of a letter U.

Figure 3:
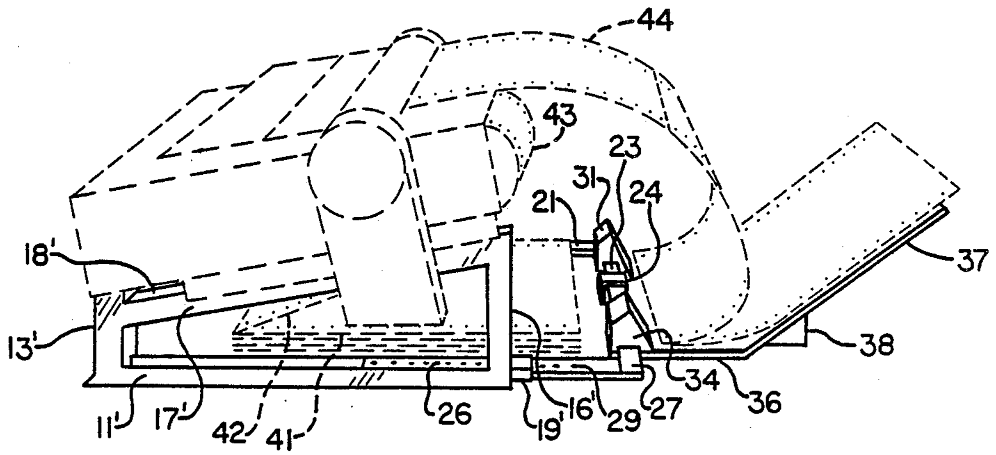
FIG. 3 is a side view of a phantom printer mounted on the stand, the printer receiving an input of phantom fan-fold paper from below it, the paper being drawn over a round drive element near the upper (rear) end of the printer and emerging at the top rear as phantom paper output that is being cradled, refolded and collected in the paper catcher to the rear of and below the printer.

In FIG. 3 the phantom paper input 42 from reserve pile 41 is bent around at section 43 as it enters the top rear of the phantom printer. The phantom printed output 44 is directed rearward and emerges above that from the printer. It is caught, folded and stacked by the catcher. Those right side parts of the catcher which are visible are the toe 34, base 36, back 37 and back brace 38; the left side part of the catcher visible is toe 31. Other visible parts of the stand include: left arm 21, right arm 26, right strip 27, ring 24, and the right platform parts front post 13, base rail 11; inclined rest 17; friction strip 18', rear post 16' and short rear sleeve 19'.

Figure 4:
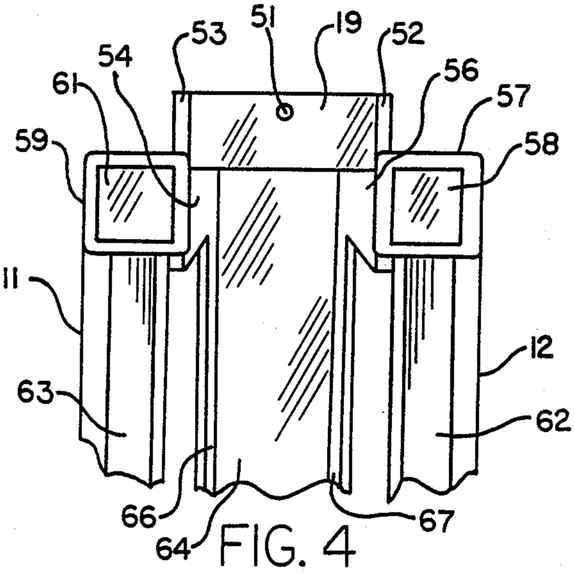
FIG. 4 is a detail of the bottom rear of a platform.

In FIG. 4 all the numbered elements corresponding to those of FIG. 1 have the same number. Additionally, these elements are depicted: reserve paper pile 41 with fan-fold sheet 42 being lifted off the pile and following fan-fold sheet 43 that is being tedded into the top rear of the printer.

FIG. 4 shows a portion of the bottom of the left platform. Peg 51 projects downward from short rear sleeve 19. The sleeve has guides 52 and 53 looking down for arm 21 to fit into slidably. The inner walls of rear post 16 are items 54 and 56. The inner walls of inclined rest 16 are items 66 and 67. The bottom of the rest 16 is item 64. Side rails 11 and 12 have short inside steeply upwardly-sloping walls 62 and 63, respectively. Rail 11 terminates at the rear in foot 57 to which rubbery cushion 58 adheres. Rail 12 terminates at the rear in foot 59 to which rubbery cushion 61 adheres.

Figure 5:
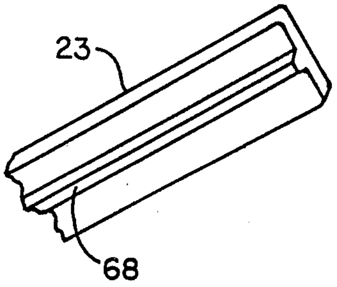
FIG. 5 is a detail of the bottom of the left side of the width spreader (which is the narrower unperforated part of the upper ell-shaped piece shown in FIG. 2)

FIG. 5 shows a tongue 68 extending along the bottom of left strip 23 of the width spreader. The tongue fits into the slot in the bottom of ring 24 (shown in FIG. 2) and also into the slots in the base of toes 31 and 34 (shown in FIGS. 8 and 9).

Figure 6:
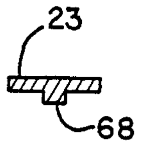
FIG. 6 is a vertical cross section of the width spreader part depicted in FIG. 5.
Figure 7:
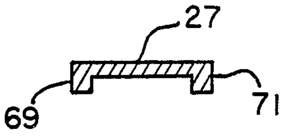
FIG. 7 is a vertical cross sectional view of the right side of the width spreader (which is the unperforated part of the lower ell-shaped piece shown in FIG. 2)

FIG. 6 shows in cross sectional elevation the strip 23 with tongue 68. FIG. 7 shows in cross sectional elevation the wider strip 27 with sides 69 and 71 between which strip 23 fits.

Figure 8:
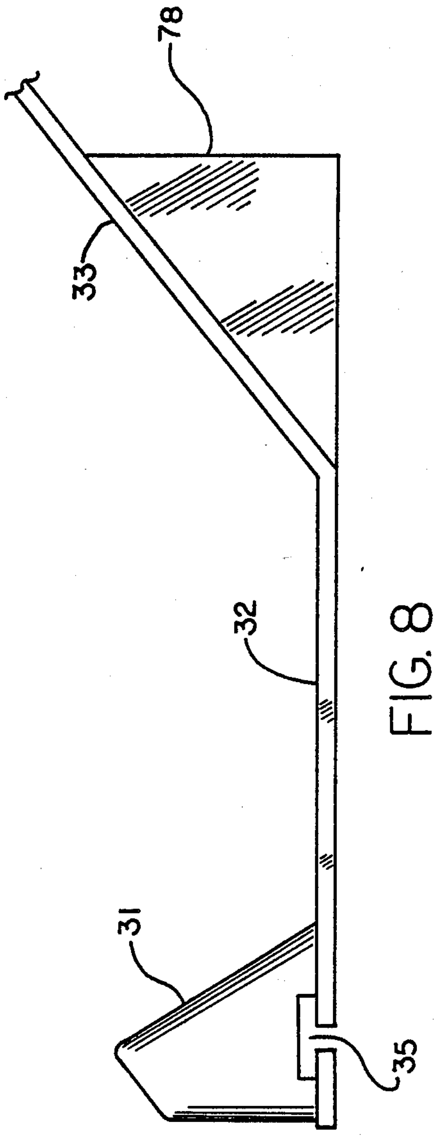
FIG. 8 is a partial profile of the left side part of the paper catcher.

FIG. 8 shows the left part of the paper catcher through which the strip 23 can slide. It has toe 31, bottom 32, back 33, and back brace 78.

Figure 9:
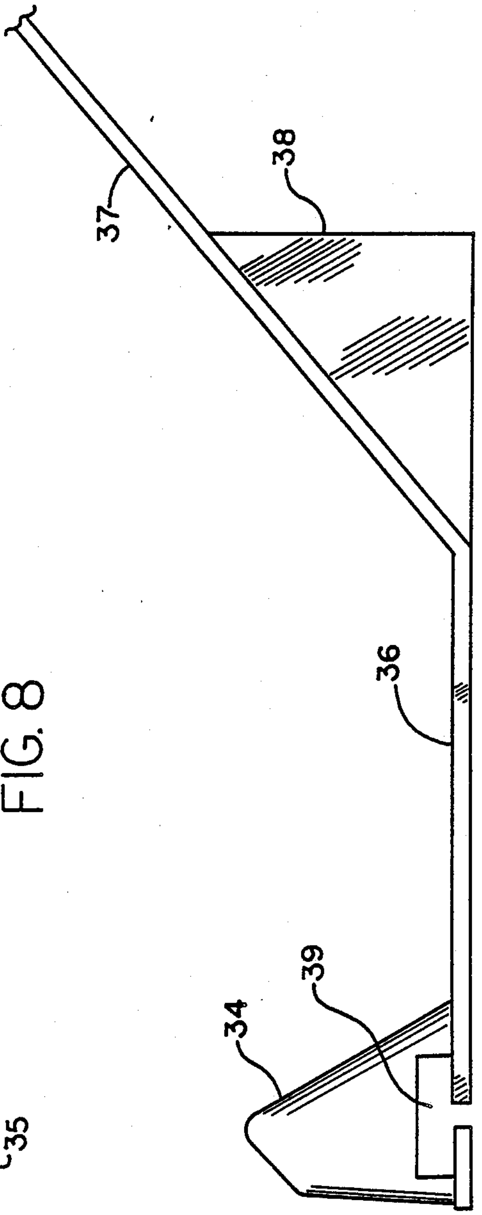
FIG. 9 is a partial profile of the right side part of the paper catcher.

FIG. 9 shows the wider and taller slot 39 of toe 34 of the right part of the paper catcher. It has bottom 36, back 37, and back brace 38. The slot 39 of this part of the paper catcher can slide over the superimposed strips 23 and 27.

Figure 10:
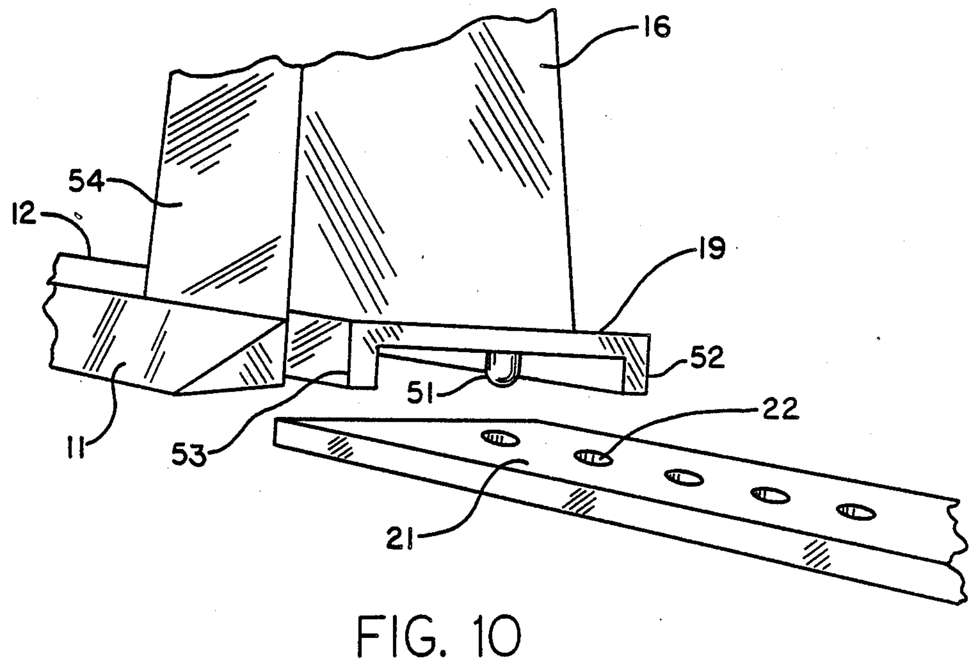
FIG. 10 is an exploded detail of the perforated arm of an ell-shaped piece shown in FIG. 2 as it is about to be fitted into the base of a platform and be engaged by the downwardly-projecting pin at the rear of the platform base. The pin fits into a selected hole in the row of perforations of the ell-shape piece.

FIG. 10 shows in exploded detail arm 21 about to be fitted into the slot 15 (not shown) between base rails 11 and 12 of the right platform. Peg 51 engages a selected hole 22 in the arm, typically with a detachable frictional fit, to fix the arm in the slot 15 and the sleeve 19.

While the width spreader has been shown as being in two parts, each of which is integral with a spacer arm projecting forward, it should be clear that the width spreader and the spacer arms projecting forward can be separate elements, and further that the width spreader can project from one platform and slidably engage the other. Set screws, clamps and other conventional holding devices can be used where desired, but normally are not necessary, especially when most of the flattened sliding connections fit reasonably well. The paper catcher can be a single paper-cradling element projected adjustably to the rear from the width spreader. For lightness of weight, ease of assembly and disassembly, and compactness of storage and packing, the illustrated embodiment is the preferred one.

Modifications and variations of the invention will be apparent to those skilled in the art in the light of the foregoing detailed disclosure and drawings. Therefore, it is to be understood that, within the scope of the appended claims, the invention can be practiced otherwise than as shown and described.

I claim:

1. A demountable, interconnected stand assembly for a paper-discharging burden in the nature of a printer, plotter or other graphic output device, the stand comprising:

a pair of load-bearing platforms, each with a base, one platform for each side of a paper supply access route to the burden for supporting the burden;

a paper-cradling support means disposed as a catcher for the paper output from the burden;

adjustable spreader means for stabilizing the space between the platforms at a magnitude effective for maintaining the burden steady and the input of paper to the burden unobstructed by a platform;

adjustable projecting means for stabilizing the distance between the paper-cradling support means and the rear of the platforms at a magnitude effective for maintaining an orderly paper flow, the paper-cradling support means being situated to the rear of the platforms, reaching substantially as deeply as the bases of the platforms, being adjustable sideways, and being joined to the spreader means, said platforms, paper cradling support means, spreader means, and projecting means being interconnected to constitute a unitary structure upon assembly.

2. The stand of claim 1 wherein the tops of the platforms slant upwardly from the front.

3. The stand of claim 1 wherein the platforms are essentially matched in structure.

4. The stand of claim 1 wherein both of the adjustable means for stabilizing form together a generally U-shaped pattern with an adjustable width spreader for stabilizing the space between platforms as the base of the U and a pair of arms reaching out forward therefrom as rear extenders, one arm extending under each platform and being engageable with the platform under which it extends for stabilizing the distance between the catcher and the platforms.

5. The stand of claim 4 wherein the U-shaped pattern is formed from a pair of coupled ell-shaped pieces slidably joined to form the base of the U.

6. The stand of claim 5 wherein the paper-cradling support means are a pair of paper-cradling supports bent to receive and induce refolding and stacking of a fan-fold paper output from the burden.

7. The stand of claim 1 wherein the paper-cradling support means comprises a pair of paper-cradling supports that are individually and slidably mounted on and extend rearwardly from the spreader means.

8. The stand of claim 1 wherein the platforms and the paper cradling support means are separable from the rest of the assembly.

9. A demountable, interconnected printer stand assembly comprising a pair of platforms, each having a base and a top frictional surface for bearing a printer, a catcher for the fan-fold paper output of the printer, said catcher being disposed to the rear of and reaching substantially as deeply as the bases of the platforms, adjustable means for stabilizing the space between the platforms at a magnitude effective for maintaining the printer steady and the input of paper into the printer unobstructed by a platform, said adjustable means for stabilizing the space being an adjustable width spreader, adjustable means for stabilizing the distance between the catcher and the platforms at a magnitude effective for maintaining an orderly paper flow, said adjustable means for stabilizing the distance being a pair of rear extenders, both of said adjustable means constituting when assembled an essentially flat U-shaped structure with the width spreader as the base of the U and a pair of arms reaching out forward from the base of the U to form the rear extenders, one arm extending under each platform and being engageable at intervals with the platform under which it extends, the U-shaped pattern being formed from two L-shaped pieces that are slidably joined to form the base of the U, said catcher comprising a pair of paper-cradling supports that are slidably joined to the base of the U, said supports being bent to receive and induce folding and stacking of a fan-fold paper output from the burden, the two L-shaped pieces, the paper cradling supports, and each platform being separable from each other for packing.

* * * * *